Nov. 28, 1944. P. ABELES Re. 22,569

CONCAVE REINFORCED CONCRETE BEAM

Original Filed June 8, 1938

Inventor,
Paul Abeles,
by Frank A. Ackerman,
Attorney.

Reissued Nov. 28, 1944

Re. 22,569

UNITED STATES PATENT OFFICE 22,569

CONCAVE REINFORCED CONCRETE BEAM

Paul Abeles, London, England

Original No. 2,229,619, dated January 21, 1941, Serial No. 212,592, June 8, 1938. Application for reissue January 16, 1942, Serial No. 427,074. In Austria June 9, 1937

1 Claim. (Cl. 72—66)

The subject of this invention is a concave reinforced concrete beam for use in building construction, particularly floors.

The main object of the invention is to provide a beam of great carrying capacity whilst having comparatively small weight. A further object is the provision of means to fix a flat and continuous under facing in the case of using said beams in floors.

With these objects in view, my invention consists in using as beams for building construction reinforced concave concrete being members in the form of half tubes having thin walls and produced by a centrifugal casting process and the reinforcement of which half tube is unevenly distributed over its cross sectional area in accordance with the static requirements.

The beam is flattened on one side for the purpose of enduring the tensile strength and may, in spite of its limited wall thickness, and because of the fact that it is made by the centrifugal casting process, be used as individual supporting means (without the intermediate layers of concrete necessary heretofore).

The use of concave beams is very satisfactory and results in an increasing of the carrying capacity as compared to the flat beams owing to the action as a spatial or arched construction. Such a mode of action has not been achieved with the known concave beams produced otherwise than by centrifugal casting process, as it was not possible to attain half tubes having sufficiently thin walls. However the production of two half tubes having small thickness can be effected simultaneously in a very simple manner by the centrifugal casting process, so that the mentioned difficulty with regard to production as compared with the known construction of floor beams no longer obtains. The improvements in the quality of the concrete due to centrifugal moulding enables the walls to be made considerably thinner than was heretofore possible so that the transport and the laying of the finished concrete beams is facilitated and on the other hand there is a substantial improvement from an economic point of view. There is also a considerable saving as compared with the usual half tubes which are not produced by centrifugal moulding, because owing to the greater strength of centrifugally moulded concrete load relieving stresses are developed in the tensile reinforcement and this effect may be amplified by connecting all the reinforcement elements to form a rigid framing, the auxiliary longitudinal and transverse reinforcement as stirrups or stirrups and tension anchorage members, or spiral members, resulting in this case in relieving stresses being developed.

Practical embodiments of the invention are shown in the accompanying drawing on which like references indicate corresponding parts.

Figure 1:
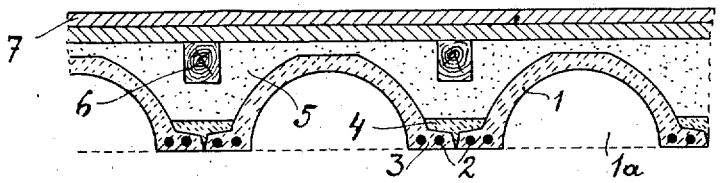
Figure 1 is a cross section of a floor comprising concave beams in accordance with my invention.

The floor shown in Figure 1 consists of a row of concave beams 1 produced by centrifugal moulding. These beams present a semicircular cavity 1*a*; the reinforcement 2 is provided in their tension zone. The beams may have lateral projections 3. The hollow beams 1 arranged side by side are joined together by filling in the joints with cement mortar or meagre concrete 4, so that the adjoining hollow beams are interconnected and uniform deflection is ensured. Floor filling 5 over the beams is provided in the usual manner. Joists 6 with floor boards 7 above are arranged in the well known manner in connection with such floorings in the recesses between the individual beams, and the result is a comparatively low floor structure whilst utilising to the full the height of the hollow beams. The beams may be spaced and the spacings may be bridged by filling members or slabs resting on the lateral projections 3. In this case the joints 4 are dispensed with.

The floor filling 5 also may be dispensed with in which case the floor boards 7 rest directly on the beams or are disposed in another known manner.

For the producing of the beams it is useful to add substances to the concrete mortar, which reduce the specific gravity, as natural light materials especially volcanic ones, fragments of bricks, pumice-stone or others.

Figure 2:
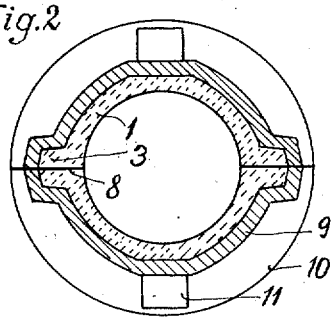
Figure 2 is a section of means for the production of two half tubes simultaneously.

Fig. 2 shows the method of producing such hollow beams 1 with projections 3 by centrifugal moulding. Plates 8 are laid in the well known manner in the mould 9 in order to separate the casting into two hollow beams. In view of the fact that in centrifugal moulding the forces act radially outwards and not in the direction of rotation, this centrifugal moulding results in the concrete being just as dense in the projections 3 as in the other parts. It is possible in a simple manner, to put in the reinforcement members and keep the same in a stretched state during the centrifugal casting process.

From the point of view of economy it is desirable to employ a mould which will produce two half tubes the width of which is greater than the height (Fig. 2), or a somewhat flattened arch, because the amount of concrete per square metre of flooring will be less than in the case of the known structures of greater height. To enable such hollow beams to be produced by a centrifugal moulding process counterweights 11 are attached to the ring 10 of the mould 9 to balance the mass. The projections 3 are slightly bevelled laterally to facilitate the removal of the two halves of the mould 9.

Figure 3:
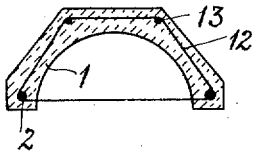
Figures 3 and 4 are sections of modified forms of the beam.
Figure 4:
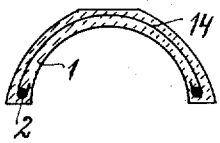

Figs. 3 and 4 show different cross sections and different reinforcement. The beam shown in Fig. 3 is multilateral externally. In addition to the tension reinforcement members 2 there are also transverse reinforcement members 12 and auxiliary or secondary reinforcement members 13 which together form a rigid framework and relieve the stresses in the tension zone 2. The transverse reinforcement 12 may consist of stirrup or spiral members. The beam shown in Fig. 4 is semi-cylindrical and only flattened at the top at the part subjected to compression. In this case there are provided only stirrup members 14 as transverse reinforcement.

Figure 5:
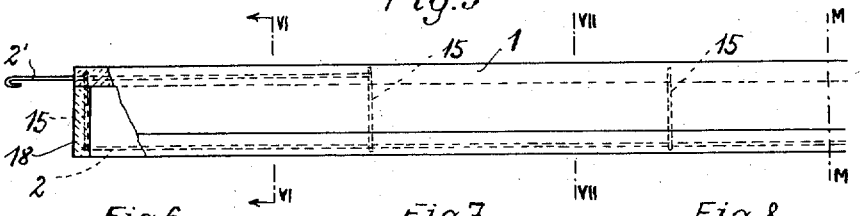
Figure 5 is a side elevation of a beam.
Figure 6:
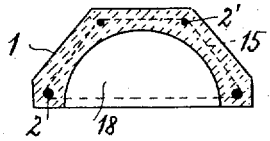
Figures 6 and 7 are cross sections on the lines VI—VI and VII—VII respectively of the beam shown in Figure 5.
Figure 7:
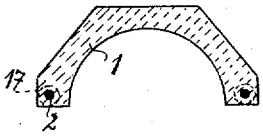

Having regard to the particular denseness produced by centrifugal moulding and the increase in the strength it is possible to entirely dispense with the transverse connection and auxiliary longitudinal reinforcement and to only provide the statically necessary tension reinforcement 2. In this case no relieving stresses are developed in default of the auxiliary reinforcement but the strength of the concrete is increased because, as proved by tests, concrete produced by centrifugal moulding but devoid of reinforcement is stronger than that provided with a weak reinforcement framework. The otherwise required stirrup members to withstand the thrust stresses are not required, providing that there are no particularly heavy loads and wide spans, since the concrete members alone are capable of taking the thrust stresses. It is, therefore, only necessary to provide several stirrup members for the purpose of the mounting and to reduce the transverse reinforcement to the minimum required for effecting the bond. Such a structure is shown in Figs. 5 to 7. In addition to the tension reinforcement 2, which does not project beyond the end of the hollow beam, tension reinforcement members 2′ are provided in the usual manner at the upper part to ensure the fixing in at the ends, said members 2′ projecting out of the hollow beams and enabling a connection to be made with wall grating or cross beams at the point of fixing in with complete or partial fixing in. The reinforcement members 2 and 2′ are connected by stirrup members 15 of which there are only as many as are required to hold the framework together when placing it in the mould. In addition, there may be separate stirrup members 15 of a number sufficient to ensure the bond. Fig. 7 also shows how the reinforcement 2 is held in position in the well known manner by concrete rings 17.

Figure 8:
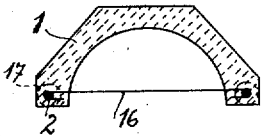
Figure 8 is a cross section of a modified form of the beam.

As shown in Fig. 8, iron tie members 16 may be provided which on the one hand serve to further secure the longitudinal reinforcement members, and on the other hand serve also as tension anchorage members. Such hollow beams with tension anchorage members 16 are suitably arranged in the end parts of the floors. The tension anchorage members may also serve to fix the flat underfacing. To close the hollow beams to gratings and cross beams suitable precast concrete plates 18 (Figs. 5 and 6) are used. Such plates may also be provided in the recesses which are formed by the top of each two adjacent beams.

Figure 9:
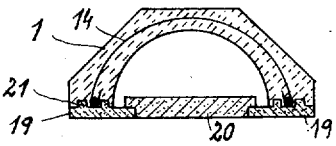
Figures 9 to 13 are cross sections of the beam showing different means for fixing a flat under facing.

As shown in Fig. 9, a flat and continuous underfacing is attained by bricks 19, which are fixed in the lower face of the beam 1, these spaces between said bricks 19 are bridged by additional brick-slabs 20. The bricks 19 are provided with ribs 21 on their top face. Said bricks are in position in the centrifugal mould (Fig. 2) prior to the charging of the latter with concrete mortar so that the bricks adhere to the lower face of the beam after hardening of the mass.

Figure 10:
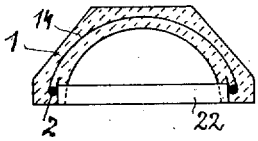
Figure 11:
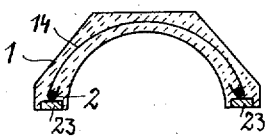

Fig. 10 shows a beam, in the lower face of which cross-rods 22 are countersunk to bridge the cavity of the beam and enabling to fix a flat underfacing on to the beam. For the same purpose, laths 23 may be countersunk lengthwise in the lower face of the beam as shown in Fig. 11.

Figure 12:
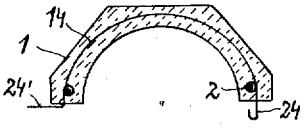
Figure 13:
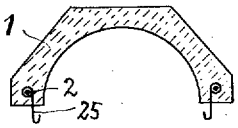

For fixing a flat underfacing, wire or flat-iron hooks may be employed, which project on the lower face of the beams. As shown in Fig. 12, said hooks 24 are formed as a continuation of the stirrups 14, wound round the bars 2. During the centrifugal casting process said continuations 24′ are laterally bent off being held fast between the two halves of the mold 9 (Fig. 2). Fig. 13 shows a modified form in which separate hooks 25 are fixed to the reinforcement bars 2.

I claim:

A reinforced concrete beam for building construction centrifugally molded in half-tubular form with a substantially semi-cylindrical cavity and a relatively thin wall, a primary longitudinal reinforcement in that part of the beam which is required to undergo tensile stress, a secondary longitudinal reinforcement in that part of the beam which is not required to undergo tensile stress, and a transverse reinforcement in the beam, such transverse reinforcement being interconnected with the longitudinal reinforcement to form a rigid structure therewith and tensioned during the manufcature of the beam, said reinforced concrete beam having bricks fixed to the lower faces of the half-tubular structure during the manufacture of the beam, the space between the bricks being bridged by additional brick slabs.

PAUL ABELES.